INVENTORS
VICTOR H NELSON
HOWARD E. WHEELER
BY
*Alfred W. Barber*

INVENTORS
VICTOR H NELSON
HOWARD E. WHEELER
BY
*Alfred W. Barber*

United States Patent Office 3,293,543
Patented Dec. 20, 1966

3,293,543
MAGNETIC INK TESTER UTILIZING A.C. OR D.C. MAGNETIZATION AND VISUAL INDICATIONS
Victor H. Nelson, Huntington, and Howard E. Wheeler, Brooklyn, N.Y., assignors to Radar Measurements Corp., Hicksville, N.Y., a corporation of New York
Filed July 9, 1962, Ser. No. 208,464
2 Claims. (Cl. 324—34)

The present invention concerns apparatus for the testing of the magnetic properties of magnetic ink printing on checks and the like.

Magnetic ink is a term which is used to designate printing ink having magnetic properties. This ink is used in printing various information on check blanks such as, account number, the bank code number, etc. so that the information can be utilized in sorting the checks by automatic machine. Machines for sorting are used which magnetically sense and utilize the information carried by the magnetic ink printing on the check. The form of the letters, quality of ink, location of the coded information and other factors necessary to a practical system are governed by standards which have been established by the American Bankers Association. The present invention concerns an integrated device for testing magnetic inks and magnetic ink printing to determine its quality and to detect trouble.

In the past, while there have been a few attempts to provide magnetic ink testing devices, no complete and integrated device has been available. Briefly, the present invention comprises a scanner for magnetic ink printing utilizing a calibrated cathode ray tube screen for observation and quantitative evaluation. Three areas are selectively scanned for information. The first area is adjacent to the lower edge of a check and known as the "low-card" area often used for coded printing on punch card checks. The second area is a band just above this first area and known as the "mid-paper" area usually used on standard checks. The third area is a band just above this second area known as the "upper-position" and which is generally not used for printing but since it is scanned by the automatic sorters, it is examined independently for extraneous magnetic ink. When the mid-paper area is used for printing, the low-card area may also be examined for extraneous magnetic ink. Since the automatic sorting machines scan all three bands simultaneously, it is important to be able to examine the two unused bands for extraneous magnetic ink which might cause errors in the automatic sorting process.

Provision in the device is made for magnetizing the magnetic ink printing to be examined by the scanning process. Another provision is made for examining the quality of magnetic ink by a smear test. The ink to be tested is smeared on a blank card. In the testing device this smear is magnetized by means of an alternating current which produces a bar pattern on the smear. This "bar pattern" is formed as the alternating flux of the recording head caused by the alternating current applied to the head variably magnetizes the ink passing under the head at a predetermined speed. Peaks of magnetization are formed at the peaks of the alternating current and flux while intervals of no magnetization are produced as the alternating current and flux pass through zero. The resulting pattern is hereafter referred to as a bar pattern. The characteristics of this bar pattern are read by one of the scanning heads. A smear of standard ink may be used as a reference.

The check during the testing process is rotated by gripping it between a belt and a rotating wheel so that it is circulated repeatedly past the scanning heads. The signals from the scanning heads are individually selectable and after amplification are displayed as vertical displacements of the beam of the cathode ray tube. The horizontal scanning is provided by a triggered sweep circuit. The triggering is supplied by a photo-electric cell in the path of the rotating check. The leading edge of the check interrupts light shining into the photo-electric cell. By moving the light and photo-electric cell around the check path the phase of the horizontal sweep with respect to the scanning heads may be varied. This phase control and a control on the sweep speed allows examining either the entire line of printing on the check or any predetermined portion. When a small portion is examined, the horizontal sweep is speeded up so that in effect the individual characters in the line of print may be spread across the face of the cathode ray tube with the effect of great magnification.

Accordingly the principal object of the present invention is to provide a method of and means for analyzing magnetic ink printing on checks and the like and in one integrated device.

Another object is to provide for examining the magnetic ink printing area of a check or the like in bands one of which represents the printing band and at least one other of which represents a band adjacent to the printing band.

Still another object is to provide for greatly magnifying the signals representing the magnetic characters and for selecting these magnified characters from any of several predetermined areas.

A further object is to provide a method of and means for evaluating magnetic ink and for comparing it with a standard ink utilizing smears of the two inks.

These and further objects will be apparent from the detailed description of the invention given in connection with the various figures of the drawing.

Figure 1:
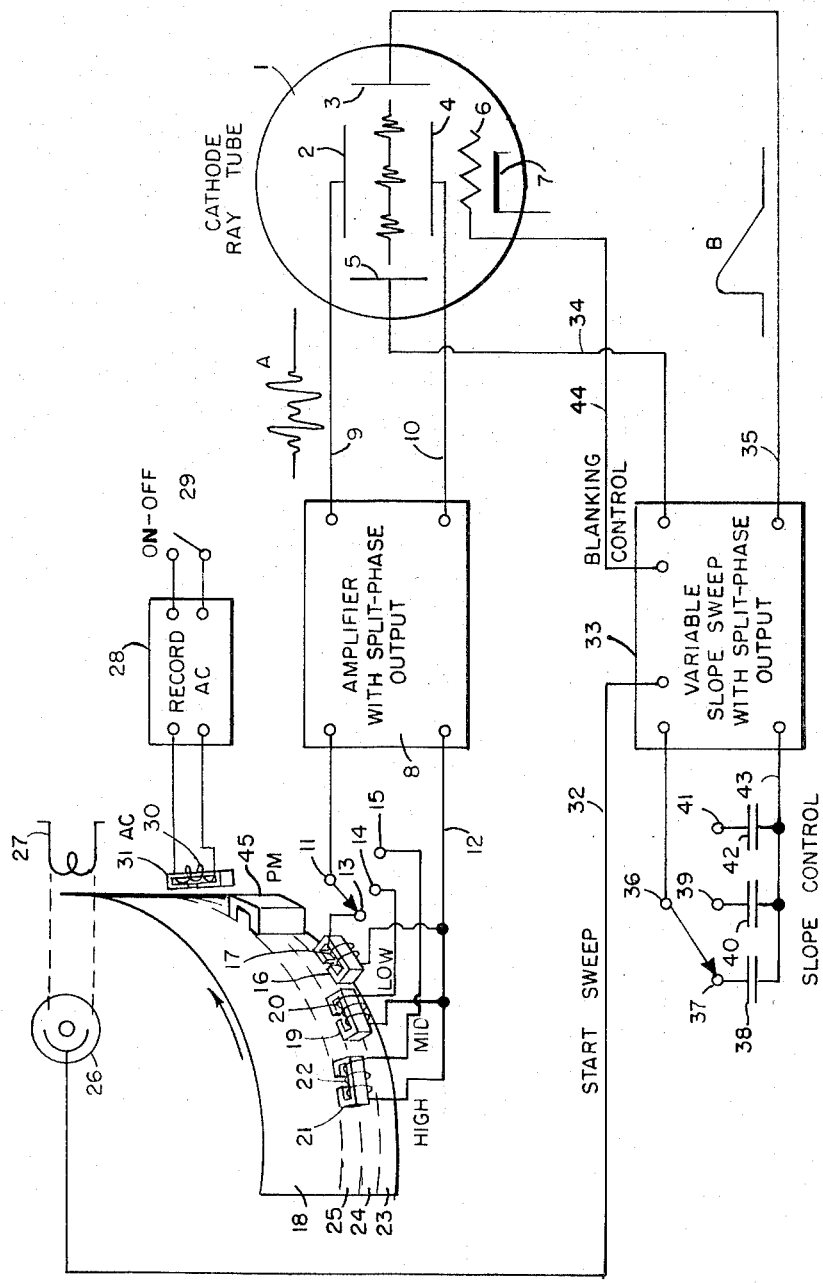
FIG. 1 is a diagrammatic representation of the preferred form of the present invention.

FIG. 1 is a diagrammatic representation of the essential elements combined into a preferred form of the present invention. A check 18 carries designations printed in magnetic ink in either low band 23 or middle band 24. The upper band 25 does not ordinarily carry magnetic ink characters and is scanned in order to detect extraneous ink particles. The three magnetic pick-up heads 16, 19 and 21 carrying signal coils 17, 20 and 22 are positioned to scan low band 23, middle band 24 and upper band 25 respectively as the check is passed across them. The check during the scanning process is passed across the various pick-up heads at a constant speed by a mechanical system shown in detail in FIG. 2. The signals picked up by the various pick-up heads are selected by a three position selector switch 11–13–14–15 and applied from switch arm 11 and over common lead 12 to a suitable amplifier 8. The amplified signals from amplifier 8 are applied over leads 9 and 10 to vertical deflection plates 2 and 4 of cathode ray tube 1 for observation and evaluation. The cathode ray tube 1 includes a cathode 7 heated by suitable means, not shown, beam intensity control grid 6, horizontal deflection plates 3 and 5, and other conventional electrodes and is powered from a suitable source, not shown. Horizontal deflection of cathode ray tube 1 is provided by variable slope sweep 33 connected over leads 34 and 35 to horizontal deflection plates 3 and 5 respectively. The return trace of the cathode ray beam is eliminated by means of a blanking signal from sweep source 33 applied over lead 44 to control grid 6. The slope of the sweep is made variable by the selection of one of capacitors 38–40–42 by means of selector switch 36–37–39–41. The common side of these capacitors is returned to sweep 33 over lead 43. The sweep is started by a signal from photo-electric cell 26 applied to sweep 33 over lead 32. Details of the circuits of amplifier 8 and sweep 33 are shown in FIG. 3.

The sweep starting signal is provided by photo-electric cell 26 when the light to it from lamp 27 is interrupted by by moving check 18. The starting point of the sweep may be varied so that the points at which the various pick-up heads start to scan the check is controlled as will be made clear in the description of FIG. 2.

In order that the magnetic ink characters on the check will cause signals to be induced in the various pick-ups the permanent magnet 45 is provided having a gap traversing the three bands of the check to be scanned. The permanent magnet 45 acts to magnetize the magnetic ink or magnetic ink particles on the check. Then the magnetized ink or ink particles on the check will generate signals in the various pick-up coils. These signals amplified by amplifier 8 and displayed on cathode ray tube 1 may be checked and analyzed by observing their amplitude, wave-form, etc. Graduated scales and reference lines, not shown, on the cathode ray tube face may be used to analyze the magnetic printing produced signals.

Provision is also made for testing the quality of magnetic ink by means of a so-called smear test. A smear of ink to be tested and a smear of standard ink are placed on a blank check across the three bands described above and these smears are magnetized in a fine bar pattern by passing alternating current from A.C. record source 28 through coil 30 of recording head 31. This A.C. source 28 is turned on by a suitable switch 29. This bar pattern is observed by means of one of the pick-up heads, say 19, and displayed on cathode ray tube 1. A comparison of the pattern derived from the sample ink may thus be compared with the pattern from the standard ink providing a means for evaluating the magnetic ink.

Figure 2:
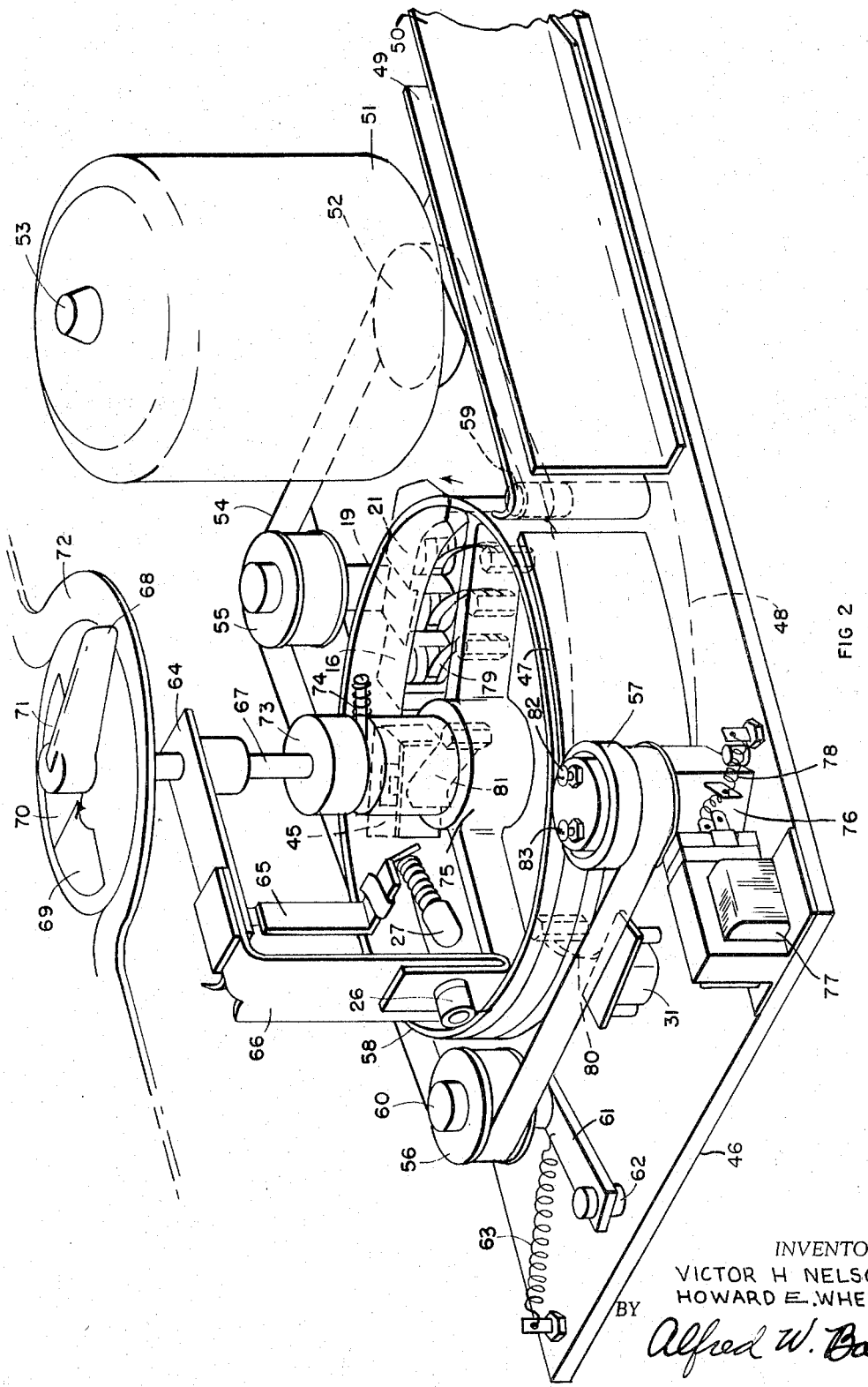
FIGURE 2 is a view of the essential mechanical part of the present invention.
Figure 3:
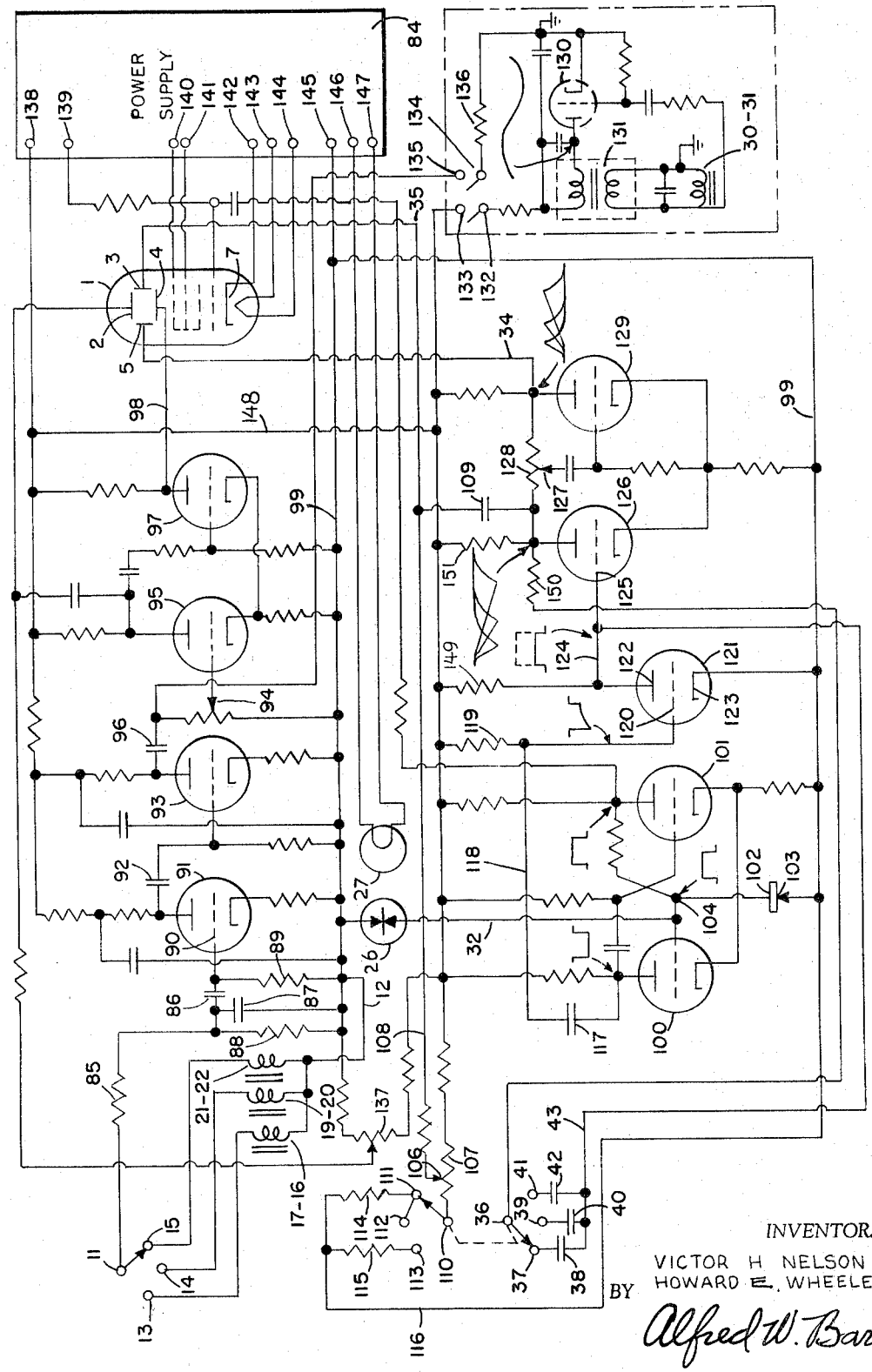
FIGURE 3 is a schematic circuit diagram of the electronic part of the present invention.

FIG. 2 shows the essential mechanical system utilized in the present invention. The pick-up heads 16, 19 and 21 correspond with the similarly numbered heads of FIG. 1. Also lamp 27 and photo-electric cell 26 correspond with those shown in FIG. 1 as does permanent magnet head 45 and A.C. recording head 31. In order to scan a check a drum-like wheel 58 is provided and a belt 54 driven by a motor 51 by means of pulley 52 on shaft 53. Belt 54 passes over idler pulley 55, spring tensioned pulley 56, pulley 57, drum-wheel 58 and a small idler pulley 59. In order to scan a check, it is fed into the system between the curved end of guide 49 and wheel 58 so that belt 54 grips it and pulls it around the path defined by the circumference of the wheel. In this passage around wheel 58 it passes over the pick-up heads, 16, 19, and 21, permanent magnet 45 and A.C. recording head 31. On its first trip around wheel 58 permanent magnet 45 magnetizes any magnetic ink printing, writing or particles so that they will generate signals in the pick-up heads on the second and subsequent trips around the wheel. In order to insure contact between the check being scanned and the faces of the pick-up and other heads, bias springs 79, 80 and 81 are provided. In order to insure that the check rides around wheel 58 resting lightly against base plate 46 adjustment screws 82 and 83 are provided to raise or lower pulley 57 until the desired slight tendency to ride down is secured. This tendency to ride down is secured by making pulley 57 slightly lower than pulley 56 by means of these adjusting screws. The proper operating tension on the belt 54 is provided by pulley 56 which is mounted on shaft 60 carried by arm 61 pivoted at 62 is spring loaded by a suitable tension means such as spring 63.

The check in passing around wheel 58 passes between lamp 27 and photo-electric cell 26 and thereby generates a signal as mentioned in connection with FIG. 1 and the function of which will be described in detail in connection with FIG. 3. Lamp 27 is mounted on arm 64 by means of bracket 65 and photo-electric cell 26 is mounted on the same arm by bracket 66. Arm 64 is mounted on shaft 67 which is rotatable in its bearing 73 and frictionally controlled by spring 74. The upper end of shaft 67 carries a pointer knob 68. Panel 72 is provided with area indicators 69–70–71 which designate the area of the check being scanned when the starting pulse from photo-electric cell 26 is correspondingly phased. For example, as knob 68 is rotated counter-clockwise, the card intercepts the light to the photo-electric cell and later the area being read by the pick-up heads moves toward the trailing edge of the check.

When the operator has completed testing, the check is ejected from the machine by energizing solenoid 77 which pulls block 76 carrying guide 47 against the tension of return spring 78. This moves guide 47 into the open position designated 48 and allows the check to pass out of the scanning path into the guide path between guides 49 and 50.

FIG. 3 shows circuit details of the electronic circuitry utilized in the system of the present invention. Where the number designations are the same, the parts correspond with those of FIGS. 1 and 2. The signals from pick-ups 16–17, 19–20 or 21–22 and selected by switch 11–13–14–15 are applied to the four stage amplifier utilizing tubes 91, 93, 95 and 97. The normally rising frequency response of the magnetic pick-ups is compensated by a simple high frequency response reducing circuit comprising resistor 85 in series feeding shunt capacitor 87. Resistor 88 is chosen to limit the resulting rise in response at the low frequency end. The frequency compensated signals thus provided across capacitor 87 are applied to grid 90 of tube 91 through coupling capacitor 86 and across grid return resistor 89. Amplified signals from the plate of tube 91 are applied through coupling capacitor 92 to the grid of tube 93 and the further amplified signals at the plate of tube 93 are applied to through coupling capacitor 96 to the grid of tube 95 by way of volume control potentiometer 94 which is used to control the amplitude of the final output signals from tubes 95 and 97 vertical plates 2 and 4 of cathode ray tube 1. The final amplifier stage comprising tubes 95 and 97 is a conventional push-pull output stage with one phase provided at the plate of tube 95 and the second phase provided by a phase splitting circuit between the plate of tube 95 and the grid of tube 97 so that the plate of tube 97 is 180 degrees out of phase with the plate of tube 95. The signals from the plate of tube 95 drive cathode ray tube deflecting plate 2 while the signals from the plate of tube 97 drive plate 4. Power supply 84 provides plate voltage for this amplifier at terminal 138, ground return over ground circuit 99 at terminal 145 and suitable heater voltage over conventional circuits, not shown. Power supply 84 also provides operating voltages for cathode ray tube 1 at terminals 139, 140, 141, 142, 143 and 144 and current to lamp 27 at terminals 146 and 147. Vertical centering of the cathode ray trace is provided by potentiometer 137.

The horizontal sweep for cathode ray tube 1 is provided by a so-called "Miller Integrator" circuit utilizing tubes 100, 101, 121, 126 and 129. Tubes 100 and 101 are connected in a conventional flip-flop circuit which switches when point 104 is open circuited. This point 104 connected to the grid of tube 100 and to photo-duo-diode 26 over lead 32 is clamped to ground by the low impedance of diode 26 as long as it receives light from lamp 27 (see FIG. 1). When the light from lamp 27 to diode 26 is interrupted by a check, the impedance at point 104 rises sharply causing conduction to shift from tube 101 to tube 100 and providing the voltage swings indicated by the wave form designations at point 104 and the plates of tubes 100 and 101. Zener diode 102–103 is provided to prevent excessive voltages at the grid of tube 100 as during warm-up of the tube circuits. Tube 121 is normally conducting due to a positive bias on grid 120 supplied through resistor 119. Cathode 123 is returned to ground lead 99 and plate 122 will normally be at a low potential due to plate current drop through plate resistor 149. When the negative going signal at the plate of tube 100, resulting from the diode action described above, reaches grid 120 through coupling capacitor 117 and over lead 118, tube 121 is cut-off and the voltage at plate 122 rises. Since plate 122 is connected over lead 124 directly to grid 125 of tube 126, its voltage will be clamped or limited when grid 125 starts to conduct and the resulting signal will be as shown by the small wave-form diagram at lead 124. Tube 126, normally non-conducting, will have a plate voltage which is normally high and substantially equal to the plate supply voltage received over lead 148. When tube 126 becomes conducting, its plate voltage will drop but the rate at which it drops is controlled by one of capacitors 38, 40 or 42 which must be charged through resistors 150 and 151 in series, over lead 43. This charging action generates a substantially linearly varying sweep voltage (Miller Integrator action) the slope of which is controlled by the selection of one of capacitors 38, 40 or 42 by means of selector switch 36–37–39–41. A series of possible sweep curves thus generated is indicated at the plate of tube 126. The smaller the capacitor selected, the steeper the slope of the sweep will be and the greater the apparent magnification of the horizontal scale on the cathode ray tube screen will be. This sweep voltage at the plate of tube 126 is applied to horizontal deflection plate 3 of cathode ray tube 1 over coupling capacitor 109. Tube 129 supplies an oppositely phased sweep from its plate over lead 34 to cathode ray tube deflection plate 5 since tube 129 is driven from a phase splitting connection through potentiometer 128 from the plate of tube 126. The adjustment provided by adjustable contact 127 permits equalizing the two phases of this sweep. The horizontal centering of the cathode ray tube is provided by adjustable contact 106 on potentiometer 107. Since the sweep length changes when the slope is changed as set forth above, recentering of the horizontal sweep is required for each sweep change. This is provided by resistors 114 and 115 connected into the centering circuit automatically by switch 110–111–112–113 ganged to switch 36–37–39–41 and returned over lead 116.

The A.C. pattern for the smear test is provided by tube 130 connected to a tuned plate, tuned grid oscillator circuit including transformer 131. When this tube oscillates, A.C. signals appear across recording head 30–31 to provide the A.C. recording described in connection with FIG. 1. This A.C. recording circuit is set in operation by supplying plate voltage to tube 130 by closing switch 132–133. Switch 134–135 which is a part of this same switch connects a shunt resistor 136 across potentiometer 94 in order to reduce the gain of the vertical signal amplifier. This is done to equalize the deflection on the cathode ray tube since otherwise the signal from the smear test would be considerably greater than the signal from character scanning.

In order that there may be no ambiguity in the reading of the claims, some of the phrases used therein are reiterated with explanations below. The "scanning zone" of the check or the like being tested for magnetic ink response may be taken to include the area along the path of the moving check occupied by the permanent magnet, the alternating current recording head and all of the pick-up heads. It will generally consist in a lower and upper zone usually used for magnetic recording on checks and a third zone just above the upper zone which is included in the scanning zone of check reading machines but not ordinarily used for recording of information on the check. The term "staggered heads" may be taken to denote vertical and/or longitudinal staggering in the positioning of the pick-up heads along the check path. The check path around the wheel is determined by the belt which holds the check against the wheel and rotates both. The exit gate allows the check to fly from the wheel into an exit path when moved into its "exit position" by the exit gate actuating magnet or solenoid. The "time base sweep" applied to the horizontal deflection plates of the cathode ray tube is supplied by the "variable slope sweep generator" as described above. The "photo-electric device" is used to "initiate sweep action" in the sweep generator (33). The alternating current applied by head 30–31 provides an "alternating current pattern" on smear test ink. The wheel against which the check is held by the belt for scanning rotates on an axis provided by axle 67 and the belt is movable or tiltable with respect to a plane perpendicular to this axis in order to cause the check to ride down against the base plate for accurate vertical positioning.

While only one form of the present invention has been shown and described, many modifications will be apparent to those skilled in the art and within the spirit and scope of the invention as set forth, in particular, in the appended claims.

What is claimed is:

1. In a device for testing magnetic ink on a check or the like, the combination of; a check moving means including a wheel and a belt for gripping to said wheel a check carrying magnetic ink samples, to move said check around said wheel; a scanning zone located about said wheel, said scanning zone containing a permanent magnet and an A.C. recording head each spanning a plurality of contiguous laterally displaced longitudinal areas on the check; means for exciting said A.C. recording head with an A.C. current for producing bar patterns on magnetic ink appearing on the check within said areas; a plurality of magnetic pickup devices mounted in positions staggered laterally and longitudinally within the scanning zone and adapted to individually pick up said bar patterns from each of said areas; means for selecting each of said pickup devices; means for amplifying signals picked up by the selected pickup; cathode ray tube means for visually displaying said amplified signals for examining the relative quality of the recordings of said bar pattern on said ink samples; a gate adjacent to the path of said check around said wheel; and means for moving said gate to an exit position to emit said check from its path around said wheel.

2. A device for testing magnetic ink as set forth in claim 1 and including a sweep generator for providing a time base sweep for the cathode ray tube, a photoelectric device positioned about said wheel for initiating the sweep in accordance with a predetermined position of the check as it is moved around the wheel, and calibrated means for moving the position of the photoelectric device with respect to the path of the moving check in the direction of its motion for varying the starting point of the sweep of the sweep generator.

References Cited by the Examiner

UNITED STATES PATENTS

| | | | |
|---|---|---|---|
| 1,669,552 | 5/1928 | Brunk | 271—69 |
| 2,628,346 | 2/1953 | Burkhart | 324—34 |
| 2,754,496 | 7/1956 | Embry | 346—74 |
| 2,870,430 | 1/1959 | Hancock | 324—34 |
| 2,942,178 | 1/1960 | Nerwin | 324—34 |
| 2,994,428 | 8/1961 | Daubendick | 209—111.8 |

OTHER REFERENCES

Knowlton, A. E.: Standard Handbook for Electrical Engineers, N.Y., McGraw-Hill Co., 1949, sec. 3–280.

Wallbaum et al.: German application, Serial No. 1,066,376, printed Oct. 1, 1959 (Kl 4213/53).

WALTER L. CARLSON, *Primary Examiner.*

RICHARD B. WILKINSON, *Examiner.*

F. A. SEEMAR, R. J. CORCORAN, *Assistant Examiners.*